United States Patent [19]

Saito

[11] 4,300,175
[45] Nov. 10, 1981

[54] TAPE RECORDER WITH ADAPTER FOR READING A CARD

[76] Inventor: Shoichi Saito, No. 2-49-13, Minamidai, Nakano ku, Tokyo, Japan

[21] Appl. No.: 99,923

[22] Filed: Dec. 3, 1979

[30] Foreign Application Priority Data

Dec. 5, 1978 [JP] Japan .............................. 53-150870

[51] Int. Cl.³ ...................... G11B 25/10; G11B 15/60
[52] U.S. Cl. ......................................... 360/94; 360/2; 360/130.2
[58] Field of Search ...................... 360/94, 2, 88, 96.1, 360/96.3, 130.2, 130.21, 105; 35/35 C

[56] References Cited

U.S. PATENT DOCUMENTS

| | | | |
|---|---|---|---|
| 3,610,635 | 10/1971 | Schiff | 360/94 |
| 3,678,212 | 7/1972 | Wild | 360/2 |
| 3,763,330 | 10/1973 | Fulwiter | 360/94 |
| 3,800,313 | 3/1974 | Budrose | 360/94 |
| 3,831,199 | 8/1974 | Vollum et al. | 360/94 |
| 3,852,817 | 12/1974 | Budrose | 360/94 |
| 3,860,961 | 1/1975 | Budrose | 360/94 |
| 4,139,875 | 2/1979 | Tatara et al. | 360/94 |

*Primary Examiner*—Alfred H. Eddleman
*Attorney, Agent, or Firm*—Toren, McGeady & Stanger

[57] ABSTRACT

A tape recorder which can be used as a card reader is disclosed. The tape recorder includes a tape recorder body provided with a movable tape guide for regulating a tape running at a position in front of a magnetic head, and an adapter which can be inserted in a cassette chamber of the body for forming a guide groove for a "talking" card. The adapter has an opening communicated to the guide groove at the end surface opposed to the head for inserting the head and a pinch roller, the head and the pinch roller being moved to the position of the guide groove through the opening when inserting the adapter. The card is run along the guide groove by contacting the card with the head, and movement of the tape guide is prevented by a peripheral edge of the head opening, the tape guide being positioned to extend from the front end of the head to the rear. Accordingly, the tape guide does not obstruct the passage of the card over the head.

4 Claims, 4 Drawing Figures

TAPE RECORDER WITH ADAPTER FOR READING A CARD

BACKGROUND OF THE INVENTION

The present invention relates to a tape recorder which can be used as a card reader.

Recently, talking cards have been considered for the purpose of teaching language to children. These talking cards are made by printing letters and pictures corresponding to the contents of a strip of magnetic tape on a card surface, the magnetic tape being secured to the card surface, to teach letters and the like together with simple songs and conversations.

Such a talking card, however, requires a separate card reader for reproducing the contents of the tape. Therefore, it is greatly disadvantageous to purchase a separate reader as it is an economical burden.

In order to remove such disadvantage, it is considered to provide the function of a card reader in a tape recorder.

It is, however, important for a tape recorder to precisely engage a running tape relative to a magnetic head for recording and a reproduction of good quality, so that a pair of tape guides usually surround the magnetic head, i.e., both sides of the magnetic head, so as to slightly project forwardly of the magnetic head. These tape guides regulate the running of a magnetic tape for precisely and positively passing onto the head surface.

Accordingly, if the abovementioned talking card is used as it is, the tape guides naturally become an obstacle and it become impossible to engage the tape surface of the talking card with the head.

SUMMARY OF THE INVENTION

An object of the present invention is to eliminate the above described disadvantages of the conventional tape recorder.

Another object of the present invention is to provide an economically advantageous tape recorder which can be used as a card reader for a talking card.

According to the present invention a tape recorder comprises a tape recorder body provided with a movable tape guide for regulating a tape running at a position in front of a magnetic head, and an adapter insertable in a cassette chamber of the body for forming a guide groove for a talking card. The adapter is provided with an opening communicated to the guide groove at the end surface opposed to the head for inserting the head and a pinch roller, the head and the pinch roller being moved to the position of the guide groove through the opening when inserting the adapter. The card is run along the guide groove by contacting the card with the head, and movement of the tape guide is prevented by a peripheral edge of the head opening, the tape guide being positioned to extend from the front end of the head to the rear.

DESCRIPTION OF THE PREFERRED EMBODIMENT

Figure 1A:
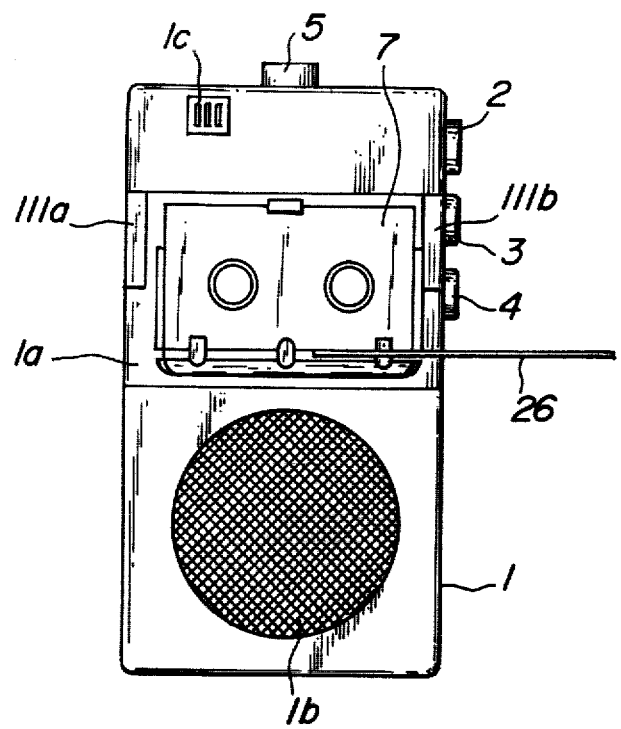
FIGS. 1a and 1b are a plan view and a side view showing one embodiment of a tape recorder according to the present invention, respectively.

Referring now to the drawings, wherein the same reference characters designate the same or corresponding parts throughout the several views, there is shown a tape recorder according to the present invention.

The example shows an embodiment for applying the present invention to a superminiature microcassette tape recorder (trade name).

Figure 1B:
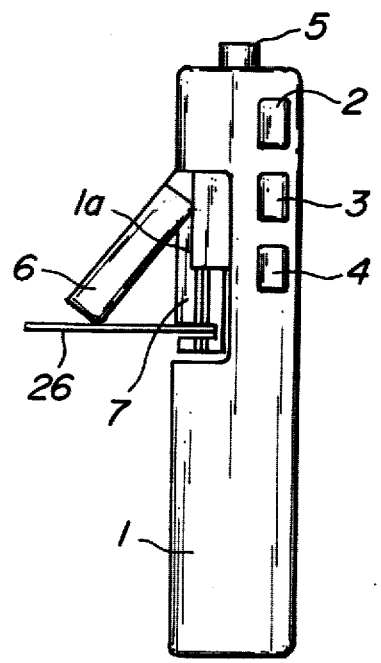

In FIGS. 1a and 1b, a tape recorder body 1 is provided with a cassette chamber 1a for inserting a tape cassette, a hole 1b for a speaker and a hole 1c for a microphone in front, a recording button 2, a reproducing button 3 and a stop button 4 each on a side surface, and a tape rewinding and quick-feeding button 5 on an end surface.

Over the opening of the cassette chamber 1a is provided a cassette lid 6 which can be opened and closed. In this cassette chamber 1a is freely inserted an adapter 7 for a talking card alternatively to a common tape cassette (not shown). In the embodiment, there is shown the state of inserting this adapter 7.

Figure 3:
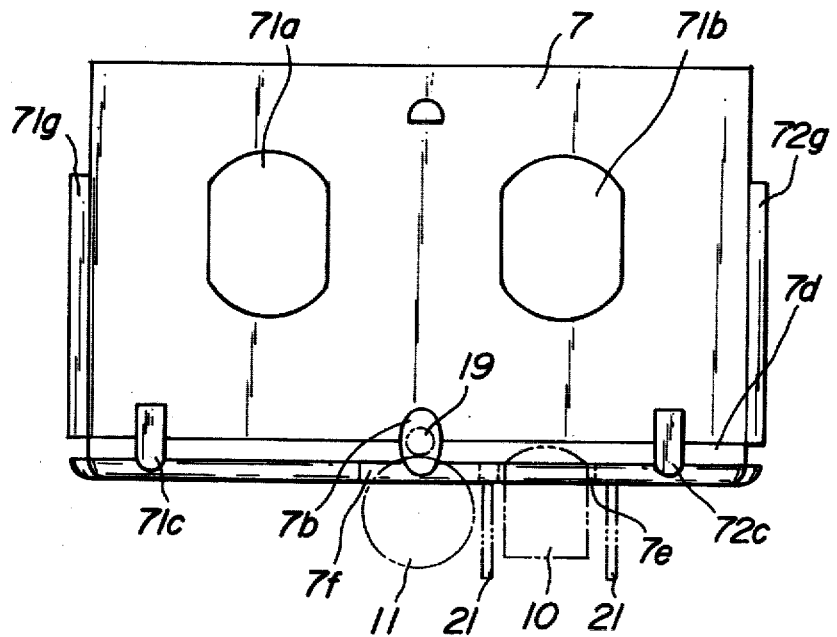
FIG. 3 is a plan view showing an adapter used in the tape recorder shown in FIG. 1.

This adapter 7 is constructed in the manner similar to a conventional tape cassette, and as shown in FIG. 3, the adapter body is provided with a pair of holes 71a and 71b for a reel in front thereof, a capstan shaft inserting hole 7b at the middle portion of one side periphery which is opposite to a magnetic head 10 and a pinch roller 11, which will be explained later on, and master holes 71c and 72c for inserting a guide pin on both sides of the inserting hole 7b.

Moreover, there is provided a guide groove 7d for the talking card which groove passes into the inserting hole 7b and master holes 71c and 72c along the side periphery. On the end surface opposed to the head 10 and the pinch roller 11 are provided an opening 7e communicating with the guide groove 7d, and a pinch roller opening 7f, respectively. The head 10 and the pinch roller 11 are inserted up to the position of the guide groove 7d through these openings 7e and 7f as shown by a broken line, and the pinch roller 11 is brought into contact with a capstan shaft 19. In this case, the above head opening 7e is small enough to insert the head 10 only.

The adapter 7 is provided with projections 71g and 72g on both side ends as illustrated. The projections 71g and 72g are for preventing such adapter from being used in a tape recorder designed exclusively for a tape cassette. That is, the tape recorder with the adapter 7 inserted, as shown in FIG. 1, is made thinner than the conventional tape recorder with regard to the thickness of side walls 111a and 111b of the cassette chamber 1a.

Figure 2:
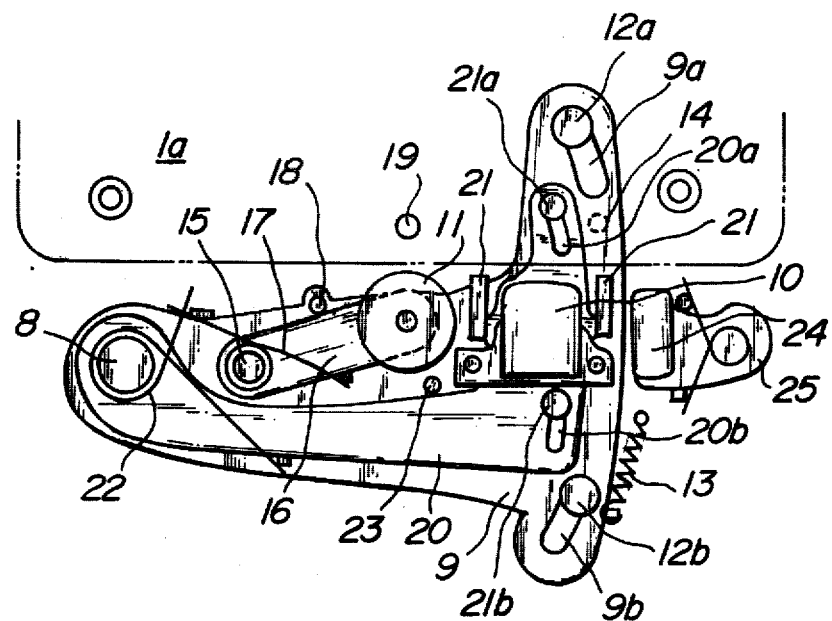
FIG. 2 is a schematic diagram showing the essential portion of the tape recorder shown in FIG. 1.

The tape recorder body 1 is provided with a shaft 8 on a chassis as shown in FIG. 2 and a lever 9 is pivoted on the shaft 8. This lever 9 is a mount for the head 10 and the pinch roller 11 thereon. A pair of long holes 9a and 9b are provided on the plate surface, and into these long holes 9a and 9b are inserted guide pins 12a and 12b for rotating within the range of the long holes 9a and 9b. Moreover, this lever 9 is biased by a spring 13 in the counterclockwise direction, but set under the illustrated state against the spring 13 by means of a pin 14 all the time, and rotated in the counterclockwise direction as illustrated by the operation of the reproducing button 3 so as to move the head 10 and the pinch roller 11 forward.

In this case, the pinch roller 11 is provided at the other end of a pinch roller lever 16 supported at one end of a shaft 15 provided on the lever 9.

This lever 16 is always biased in the counterclockwise direction by means of a spring 17 and brought into contact with a stopper 18, so that when the pinch roller 11 is brought into contact with a capstan shaft 19 by rotation of the lever 9, a desired pressing force is given by the spring 17.

The shaft 8 is also provided with a tape guide lever 20. This lever 20 is provided with a tape guide 21, a pair of long holes 20a and 20b are provided in the lever surface, and on the long holes 20a and 20b are inserted guide pins 21a and 21b supported on the lever 9 so as to be within the range of the long holes 20a and 20b independently from the lever 9. Moreover, this lever 20 is always biased in the counterclockwise direction by a spring 22 and is brought into contact with a stopper 23.

In this case, the tape guide 21 is slightly forwardly projected from the head 10, is moved forward together with the head 10 under this state by operating the reproducing button 3, and is brought into contact with the periphery of the head opening 7e when the adapter 7 is inserted into the cassette chamber 1a. The tape guide 21 then is prevented from moving forward and is positioned backward from the end of the head 10.

FIG. 2 also shows an erasing head 24 and a lever 25 for driving the head 24.

The action of the tape recorder constructed as described above will be explained as follows. At first, in the case of using the tape recorder as a card reader, the adapter 7 is inserted in the cassette chamber 1a. When the reproducing button 3 is operated under this state, the lever 9 is rotated in the counterclockwise direction through the pin 14. Then, the head 10 and the pinch roller 11 are moved forward, inserted into the head opening 7e and the pinch roller opening 7f of the adapter 7, and the pinch roller 11 is brought into contact with the capstan shaft 19 with a given pressure. In this case, the tape guide 21 is firstly moved together with the head 10 but during the course of this movement, is brought into contact with the periphery of the head opening 7e of the adapter 7, and is prevented from forward movement and positioned backward from the end of the head 10, as shown in FIG. 3.

Therefore, when the talking card 26 is guided along the guide groove 7d of the adapter 7 under this state, and the end of the card 24 is slightly inserted between the capstan shaft 19 and the pinch roller 11, the card 26 is thereafter run and driven by the capstan shaft 19. In this case, the tape guide 21 is positioned in the rear of the head 10, so that the talking card 26 is positively brought into contact with the head 10 without being obstructed by the tape guide 21.

Then, in the case of using the tape recorder as a usual tape recorder, the adapter 7 is removed and a conventional tape cassette is inserted.

In this case, the reproducing button 3 is operated so as to rotate the lever 9 in the counterclockwise direction through the pin 14, so that the head 10 and the pinch roller 11 are moved forward, the head 10 is made into contact with a tape, and the pinch roller 11 is pressed by the capstan shaft 19 through the tape. In this case, the tape guide 21 is not prevented from forward movement, so that it is moved together with the head 10 and maintains the state of slightly projecting forwardly of the head 10. Thus, the tape in the tape cassette is regulated its running position by the tape guide 21, and positively runs on the surface of the head 10.

According to the above construction, the tape guide can be positioned at the rear of the head by only inserting the adapter for the talking card into the cassette chamber when the reproducing button is operated, so that the talking card can be run and driven without being disturbed by the tape guide and used as a card reader. Moreover, when removing the adapter, the tape recorder can record and reproduce as a usual tape recorder. As a result, it is not necessary to additionally purchase a card reader and it is very economical and advantageous.

In addition, the present invention is not limited to the above embodiment but can be modified within the range of the essential feature of the present invention. For example, in the above-described embodiment, the case of a microcassette tape recorder is explained, but it can be applied to a general compact cassette tape recorder.

As described above, the present invention can provide an economically advantageous tape recorder usable as a card reader for a talking card.

What is claimed is:

1. A cassette tape recorder which is adaptable for reading a strip of magnetic tape secured to the surface of a card, comprising a tape recorder body forming a cassette chamber for receiving a tape cassette, a magnetic head having a front operating surface and a rear surface, said head being mounted on said body for movement into and out of the chamber to contact a tape in the chamber on the front surface of said head when said head is moved into the chamber, a tape guide mounted on said body for movement into and out of the chamber for guiding a tape contained in a cassette in the chamber in operative alignment with the front surface of said head when said tape guide is moved into the chamber to a position at which a projecting part or said tape guide extends forwardly of the front surface of said head, a pinch roller mounted for cooperative movement with said head to contact a tape in the chamber and for causing the tape to be driven past said head, and an adapter insertable in the chamber for enabling said head to read a strip of magnetic tape secured to a card surface, said adapter including a peripheral part which has a guide groove for receiving the card including the tape strip and for guiding the card for operative movement over the front surface of said head, said peripheral part being arranged to face said head, said tape guide and said pinch roller when said adapter is inserted in the chamber, said adapter having at least one opening communicating with said guide groove for allowing said head and said pinch roller to be inserted in said guide groove to contact the card including the tape strip, said peripheral part including an edge arranged to contact said projecting part of said tape guide and to prevent movement of said tape guide into the region of said guide groove so that said projecting part is positioned toward the rear surface of said head away from the front surface of said head when said head and said pinch roller are inserted in said guide groove of said adapter.

2. A cassette tape recorder according to claim 1, wherein said tape guide comprises a pair of elongated tape guide arms each arranged to extend generally parallel to said head between the front and rear surfaces of said head, and each of said tape guide arms is positioned by said edge of said peripheral part to extend beyond the surface of said head when said head and said pinch roller are inserted in said guide groove of said adapter.

3. A cassette tape recorder according to claim 1, including a first lever mounted to said tape recorder body for supporting said head and said pinch roller for pivotal movement relative to said body and a second lever mounted to said body for supporting said tape guide for pivotal movement relative to said body.

4. A cassette tape recorder according to claim 3, including a shaft fixed to said tape recorder body for pivoting said first and said second levers.

* * * * *